United States Patent [19]

Whatley et al.

[11] 3,867,022

[45] Feb. 18, 1975

[54] CINECONVERSION MACHINE

[75] Inventors: Thomas Jefferson Whatley, Washington, D.C.; William Miller Drennen, Jr., Great Falls, Va.

[73] Assignee: Communication Corps. Inc., Washington, D.C.

[22] Filed: Oct. 13, 1972

[21] Appl. No.: 297,241

Related U.S. Application Data

[63] Continuation-in-part of Ser. No. 92,315, Nov. 23, 1970, abandoned, which is a continuation-in-part of Ser. No. 866,240, Oct. 14, 1969, abandoned.

[52] U.S. Cl. .................................... 352/87, 352/55
[51] Int. Cl. ............................................ G03b 21/32
[58] Field of Search ............ 352/85, 87, 89, 44, 48, 352/50, 52, 54, 55

[56] References Cited
UNITED STATES PATENTS

| | | | |
|---|---|---|---|
| 2,174,931 | 10/1939 | Terry | 352/87 X |
| 3,183,770 | 5/1965 | Nyman | 352/87 X |
| 3,220,792 | 11/1965 | Vendig | 352/89 |
| 3,415,600 | 12/1968 | Yarbrough | 352/87 |

*Primary Examiner*—Monroe H. Hayes
*Attorney, Agent, or Firm*—Karl F. Ross; Herbert Dubno

[57] ABSTRACT

To record a composite picture on a film, a transparency support, a pair of condensing lenses and a mounting for a light-transmissive object are serially disposed between a pair of coaxial objectives forming part of a projector and a camera, respectively. The condensing lenses are of unequal lengths, the one of larger focal length being disposed on the side of the projection objective. The magnification ratio can be changed by the use of a zoom lens in either objective or by concurrent displacement of both objectives relative to the transparency support and the condensing lenses.

4 Claims, 12 Drawing Figures

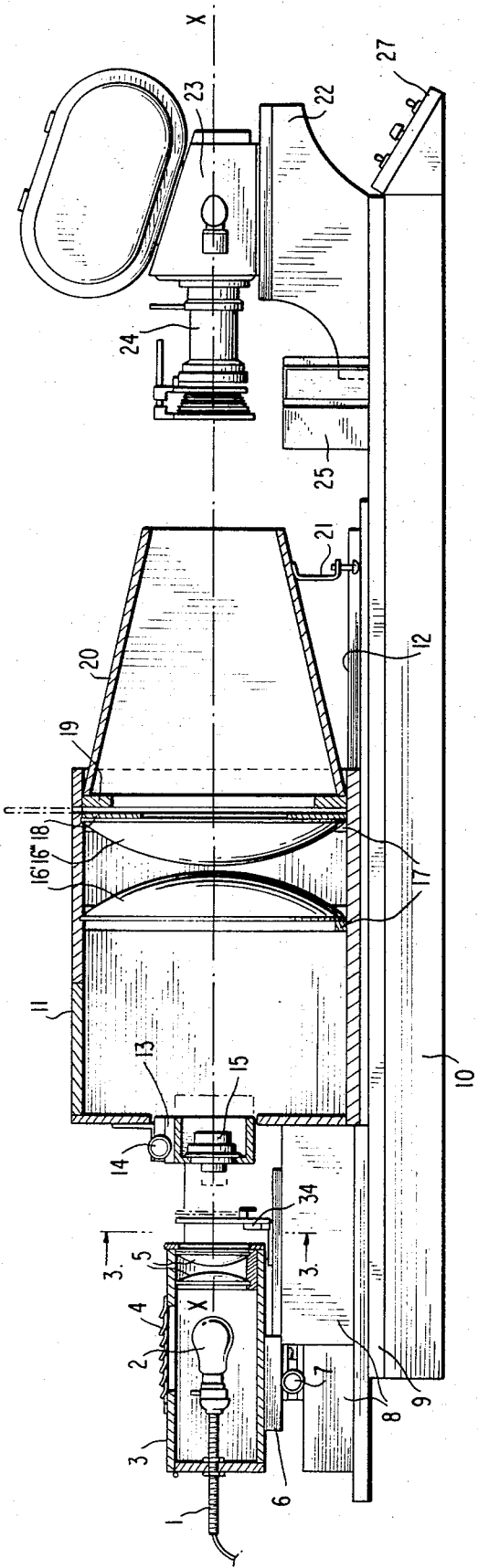
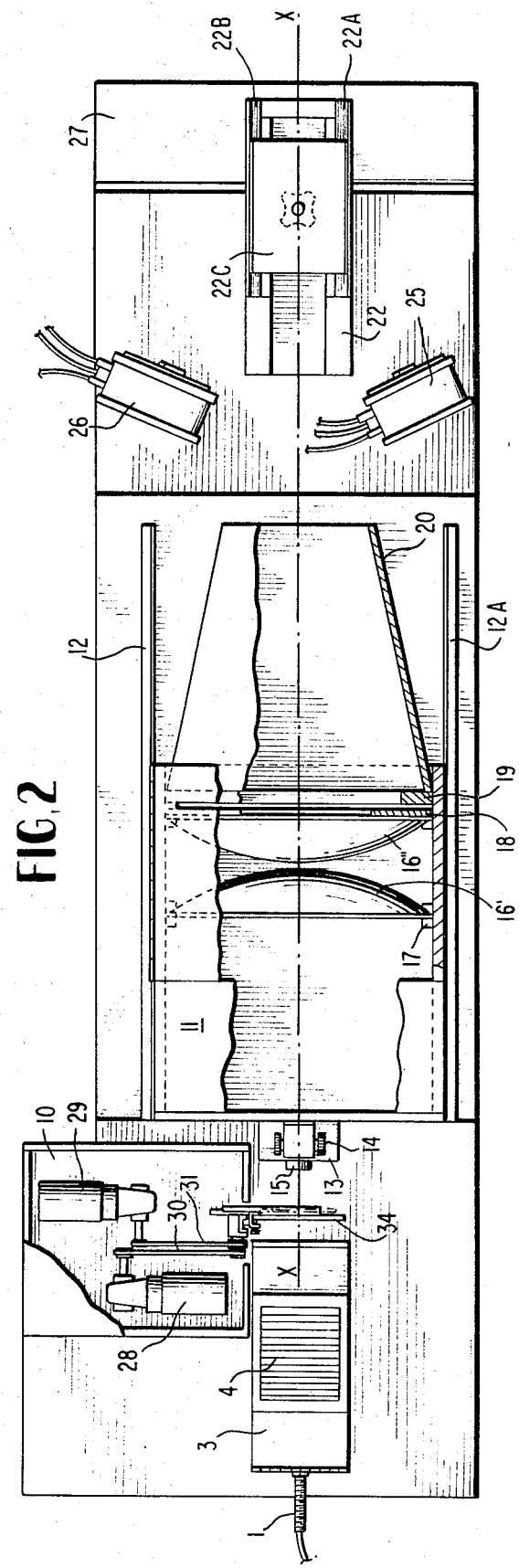
FIG. 1
FIG. 2

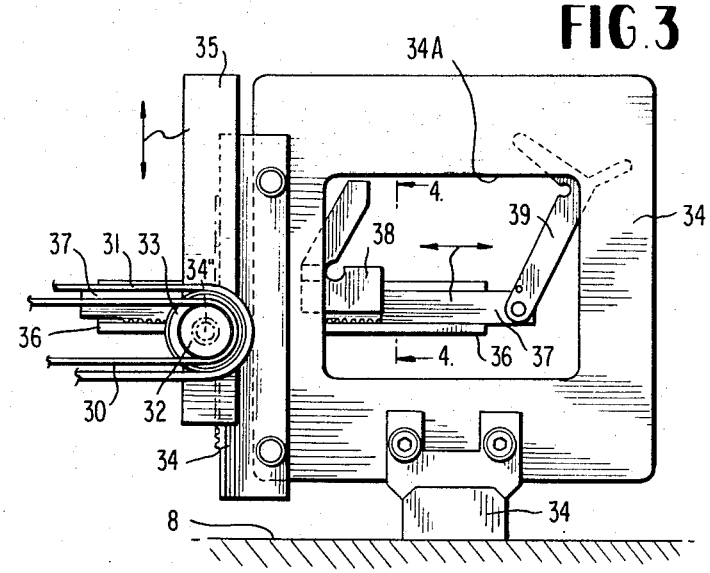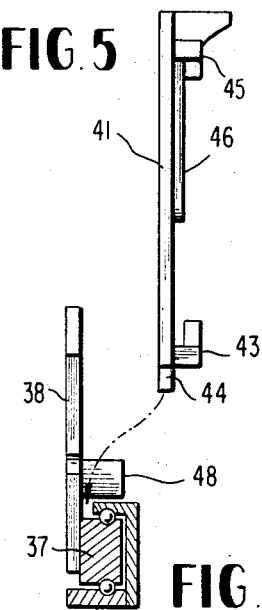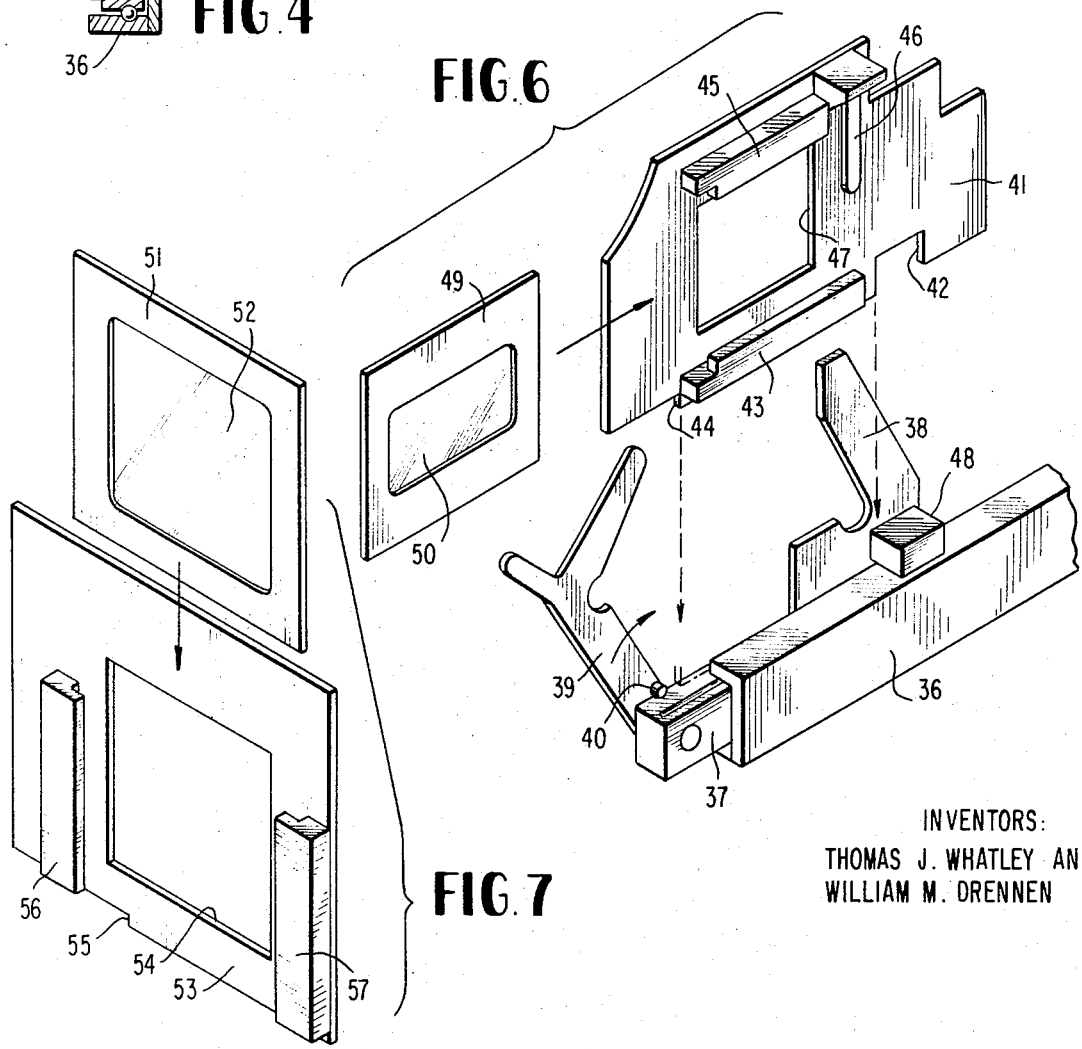

INVENTORS:
THOMAS J. WHATLEY AND
WILLIAM M. DRENNEN

BY

ATTORNEYS

CINECONVERSION MACHINE

This application is a continuation-in-part of our co-pending U.S Pat. Application Ser. No. 92,315, filed Nov. 23, 1970 and now abandoned, which was a continuation-in-part of U.S. Pat. Application Ser. No. 866,240, filed Oct. 14, 1969, now abandoned.

For the production of a motion picture, the most common technique available to the filmmaker, other than live action itself, is animation. Traditionally, animation is the process of photographing specially created art and graphic materials in a manner which gives the illusion of movement on the screen. The illusion of movement is achieved by creating many individual drawings, each only slightly different from the one preceding it. The degree of difference between drawings determines the degree and speed of apparent movement on the screen.

In the past few years, another animation technique known as the "film-O-graph" has become increasingly popular. Though the film-o-graph technique is more nearly related to animation than to live action, it is distinctly different from animation. The film-o-graph technique does not attempt to duplicate or simulate the movement of real-life animate objects as does animation. Instead, movement is limited to what might best be termed a "scanning" technique, giving the illusion of camera movement and selective zooming to inanimate subjects such as paintings, photographs, and transparencies.

This film-o-graph scanning technique has traditionally been accomplished by moving the subject matter to be photographed over the surface of a table above which an animation camera is mounted. The subject matter to be photographed is moved in a transverse, longitudinal or diagonal manner over the substantially horizontal surface of the table. This creates a scanning effect. Above the table, the camera is moved up or down to achieve closer or more distant views of the subject matter being photographed. This creates a zooming effect.

While the film-o-graph technique of scanning photographic or graphic materials is less expensive than traditional filming or specially created cell by cell animation art, it is still quite costly. All movements are carefully planned in advance and converted to mathematical formulas in order that movement and photography can be broken down into single frame elements. For example, in filming with 16 mm. sound film, it is necessary to plan 24 individual exposures for each second of desired screen time.

The film-o-graph scanning technique as now done on the animation stand has several major disadvantages. As compared to filming at live action speed, it is still relatively costly and time consuming. Also, this equipment has not been designed adequately to produce satisfactory film-o-graph footage from the extremely popular 35-mm. color slide format. The large, bulky animation stand is designed primarily to film artwork, photographs and transparencies of larger field sizes, notably 8×10 inches. The equipment is far less flexible with the smaller 24 mm. × 36 mm. image of the 35-mm. slide.

Extreme-close up lenses and other auxiliary attachments for the animation stand have not entirely solved the problem. Such devices enable the animation camera to photograph areas of a 35-mm. slide as small as one-fourth of the original. However, this is not nearly sufficient to provide the flexibility requirements for full-scale panning and scanning movements. Also, with such attachments, one is required to work at uncomfortably close ranges, increasing major technical problems such as emulsion-grain and stroboscopic effects. A more critical problem is the fact that overlay materials such as titles cannot be photographed simultaneously with the slide, since such overlays cannot properly be prepared in this small size. Such effects must be accomplished by time-consuming methods of double exposures involving the repositioning of the camera for the larger overlay materials. Thus, there is no practical capability for the utilization of hold-back masking materials needed to create composite special effects.

The small size of the 24 mm. × 36 mm. color slide and the restriction precluding simultaneous viewing of its image through the camera by both cameraman and director have created great difficulty in planning the necessary film-o-graph scanning movements for sufficient accuracy and artistic effect. Because of these composite limitations, motion pictures have rarely, if ever, been produced by the direct filming of 35-mm. slides.

The standard procedure for producing film-o-graphs from 35-mm. slides involves the preparation of color prints or duplicate transparencies from the original slide. These duplicate materials are usually 5×7 inches or larger and are subsequently photographed on the animation stand in the traditional manner. The cost of producing these duplicate materials, together with the loss of color quality caused by moving one more generation away from the original, has heretofore been a serious deterrent to film makers, limiting the use of 35-mm. slides as a source for the film-o-graph motion-picture technique. Consequently, the 35-mm. slide format has been ignored as a source for motion-picture production.

In contrast to the prior art and in accordance with the present invention, we have invented a system that can produce, for example, a 16mm. movie film directly from something as small as a 35-mm. slide with a speed, flexibility of movement, and versatility for composite photography heretofore considered impossible. In a system according to the present invention, an enlarged aerial image of the slide is produced solely by optical means facilitating full-range scanning and zooming. Thus, with the system of the present invention, we can provide an 8×10 inches or larger aerial image of the slide, for example, and then, using a camera with a zoom lens, focus directly upon the image without shifting the focal plane of that image, a feat heretofore considered impossible.

Accordingly, it is an object of our invention to provide a machine that is capable of filming or otherwise recording an optically enlarged image at motion-picture-sound speed, the same speed at which the image will eventually be projected on the screen. The machine will also be capable of operating at any other filming speeds including single frame by single frame when this is required for special applications.

It is a further object of our invention to provide a machine for producing an optically enlarged image with full scanning and zoom capability for simultaneously photographing all or any part of the enlarged image.

It is yet a further object of this invention to provide a machine that is capable of suspending the optically enlarged image in mid air without the use of a screen and substantially free of optical problems such as barrel distortion of chromatic aberration so that titles, art overlays, or three-dimensional objects, if desired, can be located at the focal plane of the suspended image.

It is a further object of our invention to provide such a machine that is capable of making available the above advantages in connection with visible objects of any suitable size such as photogaphic transparencies of sizes both larger and smaller than 35 mm.

It is yet a further object of our invention to provide a machine having the capacity for variable optical image magnification by using either fixed-focal-length or zoom camera lenses.

In the accompanying drawing:

FIG. 1 is a longitudinal sectional view of an apparatus according to our invention set up for use with a still color transparency, showing the component parts in alignment along an axis X—X;

FIG. 2 is a top plan view of the apparatus of FIG. 1 showing the component parts in alignment along axis X—X.

FIG. 3 is a cross-sectional view taken on the line 3—3 of FIG. 1, showing a color-transparency stand in detail;

FIG. 4 is a sectional detail view taken on the line 4—4 of FIG. 3, showing details of the transparency stand;

FIG. 5 is a side view of a retention plate adapted to be mounted on the stand of FIG. 5;

FIG. 6 is a perspective view of the elements shown in FIG. 4 and 5;

FIG. 7 is a perspective view of an alternative retention plate, and an associated transparency;

Figure 8:
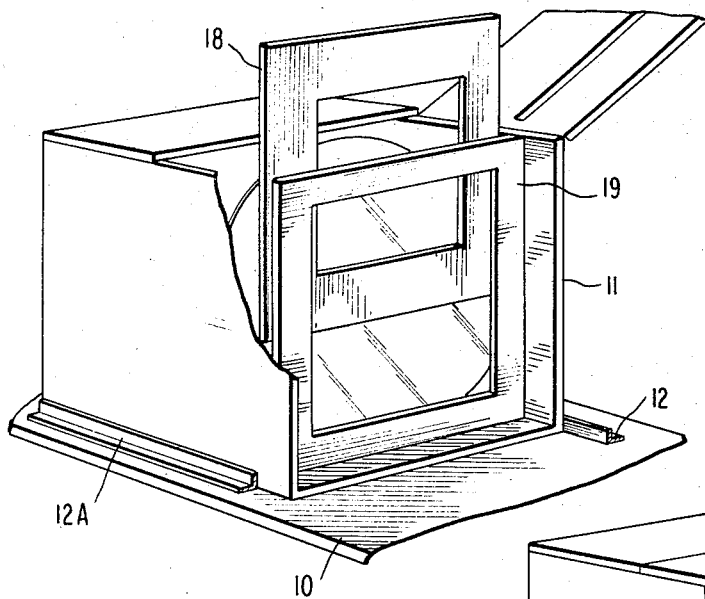
FIG. 8 is a perspective view of a condenser lens mount included in the apparatus of FIG. 1 and 2.

With reference to the above figures, we shall describe the arrangement of the various parts assembled into our cineconversion apparatus and explain its process of operation.

In FIG. 1, a light source 2 receives electrical current through a cable 1 to provide illumination in a housing 3. Any suitable light source can be employed, the light source shown consisting of a standard 250 watt photoflood bulb balanced for 3,200° Kelvin. Louvers 4 constructed in housing 3 provide adequate dispersion of heat as generated by light source 2. A pair of condenser lenses 5 are in housing 3 on a common axis X—X between light source 2 and projection lens 15. Housing 3 is attached to a rack 6 which, under the control of a pinion rotated by a turn screw 7, can be adjusted in a direction parallel to the axis line X—X. Any condenser lenses 5 establishing the correct focus can be employed, the lenses shown in FIG. 1 being a pair of standard matched plano-convex lenses, each having a focal length of 6 inches and a diameter of 4.52 inches. However, condenser lenses 5 are not critical to the operation of the machine; they can be dispensed with, if desired, and replaced by any standard diffusing material, such as opal glass.

The rack-controlling screw 7 is mounted on a base 8, which in turn is mounted on intermediate member 9. Intermediate member 9 is securely fastened to a table 10, which may be of any suitable configuration to give support to the machine at a convenient height.

A transparency stand 34 is mounted on base 8 in such fashion that its frame aperture 34A (see FIG. 3) is substantially centered on axis X—X.

In accordance with the invention, means are provided for creating an enlarged optical or aerial image of a transparency located in stand 34 and for transmitting this aerial image as a cone of light to suitable recording optics in such a manner so as to permit full-range scanning and zooming of the aerial image by the recording optics. As disclosed and with reference to FIG. 1, we provide for this purpose a pair of plano-convex condenser lenses 16',16" and projecting optics 15 mounted in a housing 11 on table 10 between lenses 16 and transparency stand 34 in such a manner as to align the axis of the projecting optics and the convex lenses with the axis of condenser lenses 5 and the center of aperture 34A of the transparency stand along the line X—X.

Projecting optics 15 is an objective received in an enclosure 13 mounted on housing 11. Enclosure 13 is adjustable along the line X—X by action of a rack secured to that enclosure 13 and pinion actuated by a turn screw 14 and carried on housing 11.

Plano-convex condenser lenses 16 are rigidly mounted in housing 11 with their curved or convex surfaces facing each other. The planar surface of each condenser lens 16', 16" is parallel with the plano surface of the other condenser substantially perpendicular to axis X—X. The condenser lenses shown in FIG. 1 are symmetrical and each have a diameter of 16 inches and a focal length of 24 inches, being separated by a distance of 1.56 mm.

Frame-shaped inserts 18 and 19 are mounted in housing 11 as shown in greater detail in FIG. 8. A light shield 20 may be removably attached to housing 11 so as to be substantially centered on the line X—X. Housing 11 is slidable along the line X—X between rails 12 and 12a.

In accordance with the invention, and as shown in FIG. 1, a camera 23 is supported by mount 22 provided with a pair of tracks 22a and 22b for the guidance of a base plate 22c. Camera 23 is seated on a base plate 22c and is adjustable in the direction of axis X—X. Any suitable motion-picture camera 23, preferably one equipped with interlens-reflex viewing, can be employed, the camera shown in FIG. 1 being an Arriflex 16 mm. BL. Camera mount 22 is securely fastened to table 10 in a fashion to assure alignment of its lens 24 with projection lens 15 and condenser lenses 5, 16' and 16". In accordance with this embodiment, and to permit variable-scale reproduction of the aerial image by the recording optics, lens 24 of camera 23 is a zoom lens. Any suitable zoom lens can be employed, the particular camera zoom lens shown in the embodiment of FIG. 1 being an Angenieux 12 mm.—120 mm.

In the embodiment shown in FIG. 1, and because of the use of matched condenser lenses 16', 16" the aerial image produced by and transmitted to camera 23 by the co-axial optical components 15, 16' and 16" is sharpest at the center point between lenses 16' and 16" as more fully described below and, therefore, projection lens 15 and camera lens 24 are positioned symmetrically on opposite sides of lenses 16 and are focused on a point midway between the vertices thereof. Thus, the working aperture of both projection lens 15 and camera zoom lens is positioned approximately 24 inches, the focal length of either of the matched condensing lenses, from the nodal or center point of this lens pair.

In order to enable full scanning of the aerial image by camera 23, projection lens 15 must have a focal length that can provide the required degree of image enlargement at the nodal point when this lens is located at this distance from condenser lenses 16', 16''. Further, and in order that camera lens 24 may be able to zoom in on the aerial image at that midpoint, the working aperture of projection lens 15 must have a diameter sufficient to relay to the camera through condenser lenses 16', 16'' a cone of light whose diameter is at least equal to that of the working aperture of camera lens 24 at the location of this aperture and must maintain this size throughout the range of axial displacement of the movable elements within the camera objective so as fully to illuminate that objective over the entire zoom range.

A projection objective meeting these requirements and used in the embodiment of FIG. 1 was a 50 mm. $f/1.4$ Nikkor lens.

In FIG. 3 the transparency stand 34 for holding the slide to be filmed is shown in detail as mounted on base 8 rigidly attached to table 10. To permit scanning of the aerial image by the camera, means are provided for moving stand 34 in any direction in a plane perpendicular to axis X—X. As shown, transparency stand 34 is provided at one edge with a rack 34' engaged by a pinion 34'' which is driven by a rubber belt 30 and a friction drive 32; while being guided by a plate 35. As rubber belt 30 rotates the friction drive 32, the pinion 34'' travels in a vertical direction along rack 34' at a predetermined speed. The plate 35 supports a sleeve 36 encasing a rack 37. A pinion (not shown) driven by a rubber belt 31 and a friction drive 33 is rotatably attached to member 35 in engagement with rack 37 for displacing some in a horizontal direction. A transparency-supporting bracket 38 is rigidly fastened to rack 37 as shown in detail in FIG. 4 and 6. A similar bracket 39 is pivotally attached to rack 37 so that it can rotate in a plane substantially perpendicular to line X—X. A pin 40 is rigidly fastened to bracket 39.

A backing plate 41, shown in detail in FIGS. 5 and 6, is designed to interfit with rack 37. A cutout 42 in plate 41 accepts a lug 48 allowing the lower edge of backing plate 41 to rest on rack 37. Bracket 39 is spring-biased so as to be urged into clockwise rotation as indicated in FIG. 6 to bring pin 40 into engagement with a shoulder 44 of plate 41 whereby this plate is held in a fixed horizontal position transverse to line X—X. Brackets 38 and 39 hold the plate 41 against movement in a direction parallel to line X—X. A color slide or transparency 50, set in a frame 49, can be slid into engagement with plate 41 and held securely in proper horizontal and vertical alignment by ridges 43, 45 and 46 thereof. In that position, the center of slide 50 should be in substantial alignment with the center of a window 47 in backing plate 41.

In FIG. 7 we have shown a modified backing plate 53 that could be substituted for plate 41, if desired. This plate 53 can be positioned so that its lower edge rests on rack 37 while a shoulder 55 thereof is urged by pin 40 to the right so as to press a flange 57 against lug 48.

In such a position, a transparency 52 in a frame 51 can be slid into engagement with backing plate 53 and held in position by flanges 56 and 57 thereof so that the center of transparency 52 is in substantial alignment with the center of its aperture 54 substantially along line X—X.

FIG. 8, shows how inserts 18 and 19 can be slide into engagement with housing 11 thereof with the aid of guide slots. The inserts 18 and 19 are substantially parallel and spaced apart a sufficient distance to allow insertion of a third plate between them.

Figure 9:
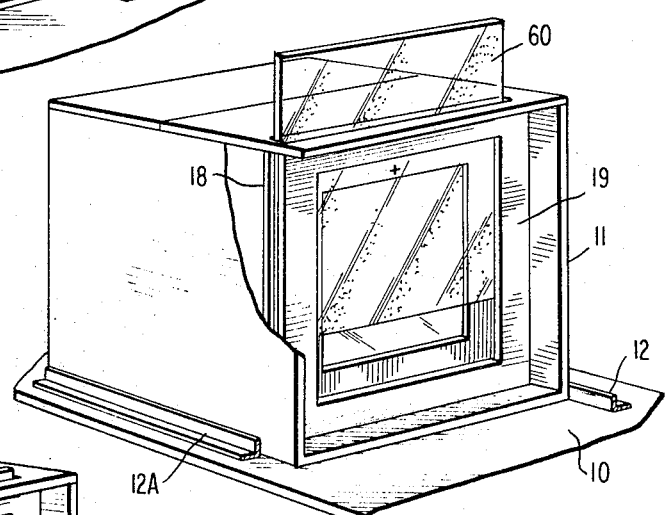
FIG. 9 is a perspective view of the same lens mount showing the insertion of a translucent screen.
Figure 10:
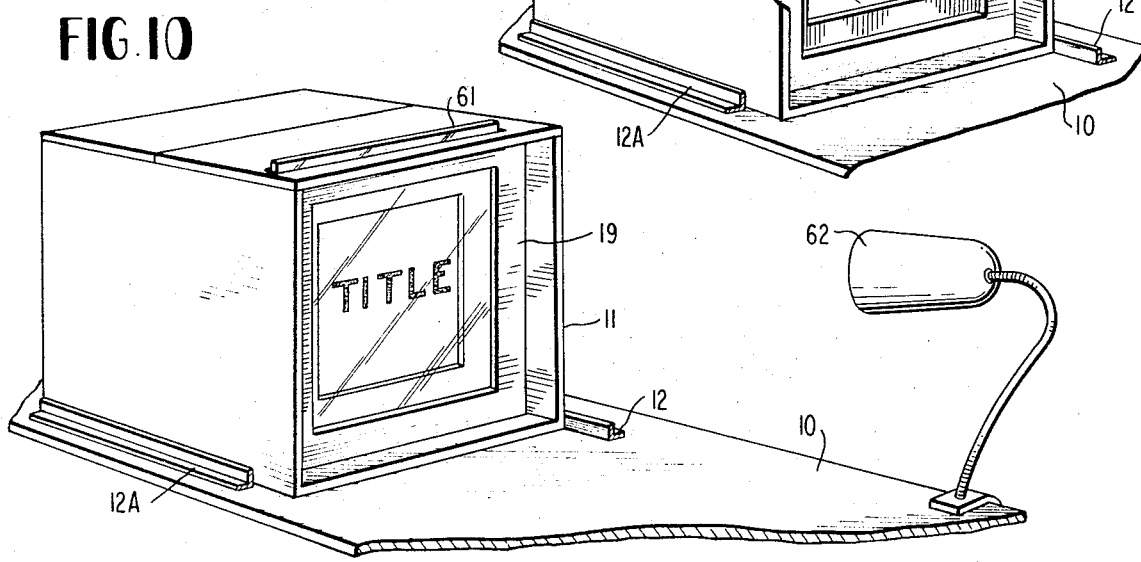
FIG. 10 is a perspective view of the lens mount showing the insertion of a transparent title plate.

As shown in detail in FIGS. 9 and 10, several types of plates could be inserted between frames 18 and 19. According to FIG. 9, a translucent plate 60 can be inserted when it is desired to preview the aerial image projected from the color slide. FIG. 10 shows the insertion between the frames 18 and 19 of a transparent title plate 61 upon which selected information can be displayed during filming of the color slide. A slight source 62 illuminates the information displayed on transparent title plate 61 so as to incorporate that information in the composite film being taken by camera 23.

Our invention, however, is not limited to the interposition of transparent, or translucent plates in the light path from lamp 2 but permits the use of any object of suitable size. For example, we have placed a goldfish bowl (not shown) in front of the condensing lenses and photographed the aerial image of a coral reef originating from a 35-mm. color slide in such manner that the reef appeared to be under water with goldfish swimming around it.

Figure 11:
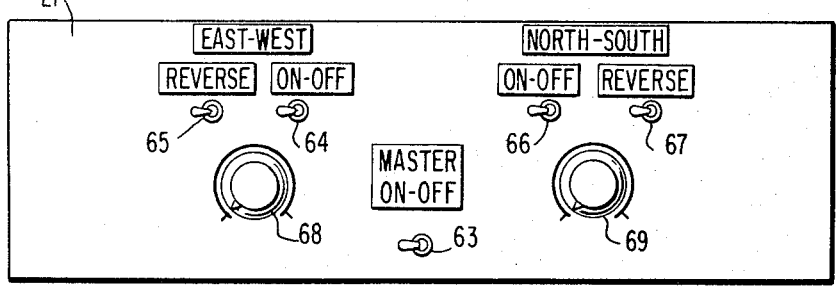
FIG. 11 is a plan view of the control panel for the apparatus shown in the preceding figures.

FIG. 11 shows a control panel 27 mounted on table 10 and including a master on-off switch 63 and switches to control the direction and speed of movement of rubber belts 30 and 31. Timers 25 and 26, seen in FIGS. 1 and 2, are electrically connected with panel 27 to control panning movements of the slide. A switch 66 energizes an electric motor 28 (FIG. 2) to run belt 30 in one direction. Any reversible motors with proper gear-reduction ratios may be used. Those shown are Daton AC Universal motors, 115 volts, 0.06 HP, type 2MO34, complete as a unit with a Von Weise Gear Company gear-reduction box having a maximum shaft speed of 180 R.P.M. with additional set of electrical leads in parallel with the leads already wired to the motor. This double set of leads makes possible a polarity reversal when these four leads are coupled to a double-throw reversing switch 67. The speed of rotation of electric motor 28 can be controlled by a knob through a 7,500-ohm variable reistance forming part of a voltage regulator in the power supply of the motor. The suitable voltage regulator may have a maximum capacity of 1,000 watts.

In a like manner, a switch 64 can energize electric motor 29 to run rubber belt 31 in a preselected direction. That direction of rotation of motor 29 can be reversed by a switch 65. The speed of rotation of motor 29 can be controlled by a knob 68, identical in every aspect with knob 69.

In the operation of the system of FIG. 1, light source 2 is energized and housing 3, enclosure 13 and housing 11 are adjusted to provide optimum focus of the aerial image emanating from transparency 50. Additional pictorial matter such as title carrier 61 can be inserted, if desired, with energization of light source 62. However, if these inserts are used, the projection and camera lens should be refocused on a point which is just in front of the planar surface of the condensing lens proximal to the camera, i.e. the right-hand lens 16''.

The desired filming can then be accomplished by moving the slide 50 to provide scanning and by separately or simultaneously moving the camera lens 24 to provide zooming on the aerial image. The desired scanning movement of transparency 50 within its plane, substantially perpendicular to line X—X, is brought about by actuating switch 64 alone, switch 66 alone, switch 65 alone, switch 67 alone, or switch 64 together with switch 66 or 67, switch 65 together with switch 66 or 67, switch 66 together with switch 64 or 65, or switch 67 together with switch 64 or 65. Thus, movement in that plane in a vertical, horizontal or diagonal direction may be obtained and the speed of movement in any of these directions may be controlled by knobs 68 and 69. Furthermore, the time during which such movement will be allowed to take place in any of these directions can be controlled by timers 25 and 26.

In the system so far described, the varifocal objective 24 can be adjusted so that its internal optical elements move backward and forward along line X—X to provide an optical zoom toward or away from the aerial image of the color transparency 50. We have discovered that the combination of lenses arranged as shown and described provide a sufficiently stabilized aerial image projected from transparency 50 over a considerable distance along line X—X, to allow adjustment of this objective over the entire zoom range of camera 23 without shifting the focal position of that image.

Alternatively, a zoom lens can be utilized as the projection objective 15 and a fixed-focal-length lens may be used for the camera objective 24.

While the above-described system has proven satisfactory when it is desired to film only the aerial image, it presents problems when extraneous pictorial matter is to be superimposed on the aerial image, such as title carrier 61. Obviously, reproduction is improved if this pictorial matter and the aerial image are located in the same focal plane. It is extremely difficult physically, however, to place such transparent objects between the condensing lenses 16, and it is impossible to illuminate these objects when it is located at that point. Thus, elements such as plates 60 and 61 are advantageously placed in front of the planar surface of the condensing lens 16'' located closer to the camera 23; evidently, the projection and camera objectives must then both be refocused upon this plane. With matching lenses 16' and 16'', however, the aerial image is not sharply focused in this plane and undergoes a degree of distortion, e.g., in the form of a slight incurving of its edges. Moreover, the placement of supplemental structure directly in front of a condensing lens creates a problem of glare because the lights required to illuminate such structure have to be in close proximity to the pair of condensing lenses.

In accordance with another feature of this invention, therefore, and to provide greater flexibility in the placement and lighting of these elements, we have found that we can shift the point of optimum focus of the aerial image outwardly from the center of the condensing lenses and to a location in front of the camera-side lens 16'' without any impairment of optical quality and with subtantially reduced light reflection when elements of that character are placed at this point for superimposition upon the aerial image. More specifically, we have discovered that by deliberately unbalancing the two condensing lenses 16', 16'' shown in FIG. 1, i.e., by using lenses of different focal lengths and making the focal length of the projector-side lens 16' greater than that of the camera-side lens 16'', the point of optimum focus of the aerial image can be shifted toward camera 23 without affecting the ability of the camera to zoom in on the aerial image.

In such a modification of the machine of FIG. 1, the condenser lens 16' had a focal length of 38 inches, and the condenser lens 16'' then placed approximately 38 inches from the center point of the condensing lenses and the camera lens 24 was placed approximately 24 inches from that center point, the total distance therebetween being approximately equal to the combined focal length of the 2 lenses.

With this arrangement, the point of optimum focus of the aerial image could be shifted outwardly at least 6 inches to a plane where transluminable elements desired to be superimposed on the aerial image could be conveniently placed without affecting the ability of the camera to scan and zoom on the aerial image. The projection and camera objectives are then focused on this point and filming proceeds in the same manner as described above. While some chromatic aberration exists because the aerial image has been shifted outwardly from the nodal point of the pair of condensing lenses, this can easily be corrected by placing a negative lens such as a meniscus in front of the camera objective.

Preferably, and in order to provide an aerial image of sufficient size to allow a full range of scanning, the combined focal lengths of the unmatched condensing lenses should be at least about 54 inches.

In another system of this nature, the condenser lens 16' had a focal length of 42 inches and the condenser lens 16'' had a focal length of 38 inches. Projection lens 15 was then placed approximately 42 inches from the nodal point of the condensing lenses and camera lens 24 was placed approximately 38 inches from the nodal point. It was found that in this instance there was less chromatic aberration of the aerial image because of the longer overall focal length of the system.

Figure 12:
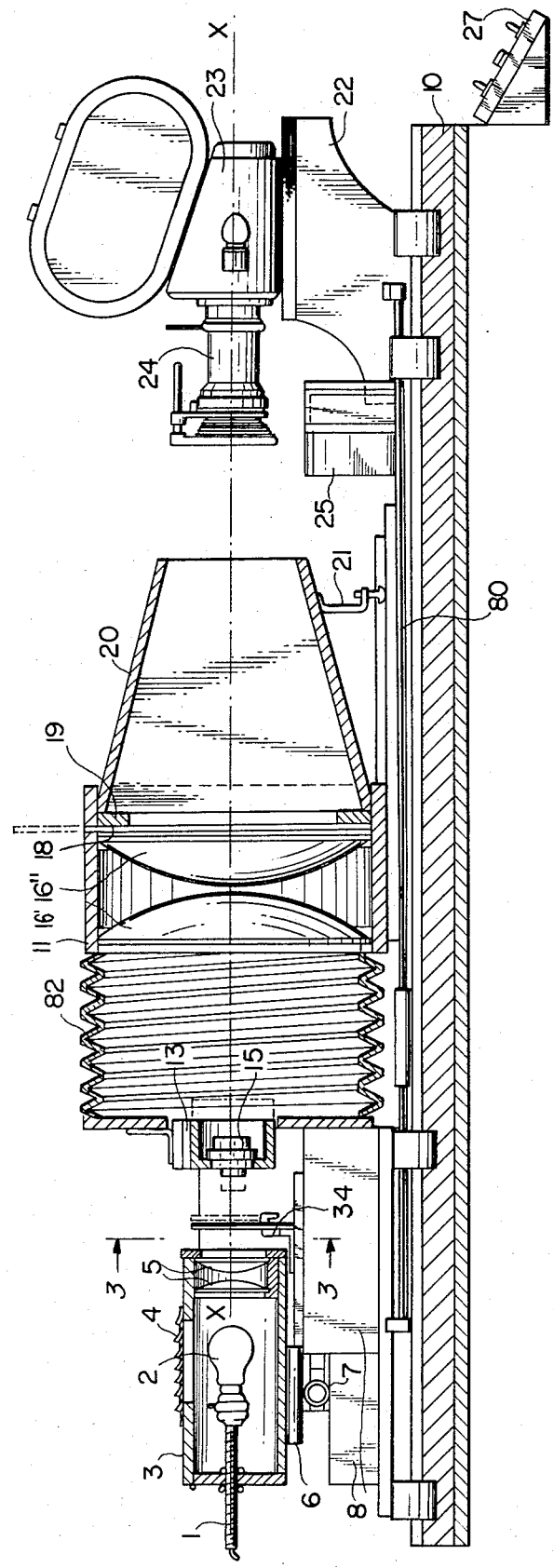
FIG. 12 is a sectional view similar to that of FIG. 1, showing an alternative apparatus for use with a fixed-focal-length camera.

In accordance with our present invention, we have found that with the above-described unbalanced optical system a zoom effect can be achieved by coordinating the movement of transparency stand 34, projection lens 15 and camera 23 even if the varifocal camera objective is replaced by a fixed-focal-length camera lens provided with appropriate means to follow focus as the camera moves toward the aerial image. As shown in FIG. 12, this is accomplished by mounting camera stand 22 and base 8 so that they slide with respect to table 10 and by linking them together with a rod 80 which bypasses the housing 11 of lenses 16', 16'' leaving it stationary but allowing lamp housing 3, transparency stand 34, projector enclosure 13 and camera assembly 23 to be jointly moved forward or backward along the optical X—X. Projection lens 15 is made movable by providing a bellows 82 between its enclosure 13 and the condenser-lens housing 11. This linkage allows the cameraman to physically move the camera 23 toward the aerial image to the extent necessary for achieving the degree of optical magnification which he requires of the aerial image. Conventional focusing means must be employed at both the projection and camera objective throughout this movement to keep them focused upon the nodal point of the condensing lenses in order to allow for stabilization of the aerial-image position.

We have found that, in order to provide for a full range of zooming on the aerial image by the fixed-focal-length camera, the camera and projection objectives must be positioned at approximately equal distances from the nodal point of the condenser lenses, with a separation of these objectives approximately equal to the combined focal length of the lenses 16' and 16''. Thus, for example, with the pair of lenses of 38-inch and 24-inch focal length described before, the projector lens and the camera lens are each positioned approximately 31 inches away from the nodal point of condenser lenses 16', 16''. In this situation, the focal length of projection lens 15 is increased to 85 mm. or greater to accommodate the greater working distance. Any suitable 85-mm. lens can be used, such as an $f/1.8$ Nikkor. The projection and camera objectives are then focused on the aerial image at the nodal point of the lens and filming proceeds as previously described except that, instead of magnifying the image by adjustment of a zoom lens, the camera is moved toward the aerial image in much the same way as an animation camera moves toward a work of art.

In addition to the primary purpose of producing visual images in continuously varying degrees of magnification for recordation, as explained above, our invention enables a visual image to be produced and magnified in varying degrees in one continuous and unbroken movement for purposes other than recordation, such as for live use in teaching machines, training devices and any other equipment in which this capability, with or without scanning, is of interest.

The invention in its broader aspects is not limited to the specific details shown and described and departures may be made from such details without departing from the principles of the invention and without sacrificing its chief advantages.

What is claimed is:

1. An optical system for reproducing a picture with a variable rate of magnification, comprising:
    support means for a picture to be reproduced on a distant receiving surface;
    condensing lens means interposed between said support means and said receiving surface;
    a first objective coaxial with said lens means movably disposed on the side of said lens means remote from said receiving surface for projecting an aerial image of said picture via said lens means in a transverse plane;
    a second objective coaxial with said lens means focused upon said transverse plane and movably disposed on the side of said lens means opposite said first objective for projecting upon said receiving surface a replica of said aerial image; and
    mechanism for jointly displacing said objectives with concurrent refocusing of said second objective to vary the relative proportions of said replica and said picture.

2. A system as defined in claim 1 wherein said lens means comprises a pair of closely spaced positively refracting lens members.

3. A system as defined in claim 2, further comprising mounting means for a transparent object in the region of said transverse plane.

4. A system as defined in claim 2 wherein said lens members are planoconvex with their convex sides facing each other.

* * * * *